(12) United States Patent
McHugh

(10) Patent No.: US 6,396,404 B1
(45) Date of Patent: May 28, 2002

(54) DOUBLE CHECK VALVE ASSEMBLY FOR FIRE SUPPRESSION SYSTEM

(75) Inventor: George J. McHugh, Broomall, PA (US)

(73) Assignee: AGF Manufacturing, Inc., Malvern, PA (US)

( * ) Notice: Subject to any disclaimer, the term of this patent is extended or adjusted under 35 U.S.C. 154(b) by 0 days.

(21) Appl. No.: 09/671,632

(22) Filed: Sep. 28, 2000

Related U.S. Application Data

(63) Continuation-in-part of application No. 09/484,168, filed on Jan. 18, 2000, which is a continuation-in-part of application No. 09/225,344, filed on Jan. 5, 1999.

(51) Int. Cl.$^7$ ................................................ G08B 21/00
(52) U.S. Cl. ...................... 340/606; 340/603; 340/608; 137/557; 169/23
(58) Field of Search ................................. 340/606, 603, 340/608; 137/557, 552, 559; 169/23

(56) References Cited

U.S. PATENT DOCUMENTS

| | | | |
|---|---|---|---|
| 3,176,284 A | 3/1965 | Jones et al. ............... 340/530 |
| 3,597,632 A | 8/1971 | Vandemore et al. ........ 327/393 |
| 3,623,088 A | 11/1971 | Peterson ................. 340/529 |
| 3,625,289 A | 12/1971 | Gloeckler ................ 169/39 |
| 3,633,676 A | 1/1972 | Gloeckler ................ 169/40 |
| 3,688,130 A | 8/1972 | Granieri ................. 327/449 |
| 3,713,126 A | 1/1973 | Stettner ................. 340/527 |
| 3,715,623 A | 2/1973 | Szabo .................... 327/457 |
| 3,715,700 A | 2/1973 | Gloeckler ................ 337/407 |
| 3,740,585 A | 6/1973 | Squiers .................. 327/456 |
| 3,742,337 A | 6/1973 | Digneffe ................. 327/457 |
| 3,745,382 A | 7/1973 | Hoge et al. .............. 327/402 |
| 3,746,887 A | 7/1973 | Lorenz ................... 327/455 |
| 3,749,864 A | 7/1973 | Tice ..................... 200/81.9 |
| 3,756,321 A | 9/1973 | Gloeckler ................ 169/40 |
| 3,764,832 A | 10/1973 | Stettner ................. 327/392 |
| 3,779,004 A | 12/1973 | Gloeckler ................ 59/93 |
| 3,794,858 A | 2/1974 | Squiers .................. 327/143 |
| 3,846,648 A | 11/1974 | Scott .................... 327/392 |
| 3,857,277 A | 12/1974 | Moore .................... 73/28 |
| 3,874,456 A | 4/1975 | Gloeckler ................ 169/39 |
| 3,896,850 A | 7/1975 | Waltrip .................. 137/554 |
| 3,906,641 A | 9/1975 | Freeman .................. 33/363 R |
| 3,921,989 A | 11/1975 | Ward ..................... 277/173 |
| 3,940,634 A | 2/1976 | Grogan ................... 327/451 |
| 3,946,691 A | 3/1976 | Freeman .................. 318/588 |
| 4,103,294 A | 7/1978 | Stettner et al. .......... 367/136 |
| 4,152,608 A | 5/1979 | Nakasone et al. ......... 327/402 |
| 4,319,236 A | 3/1982 | Brace et al. ............. 340/679 |
| 4,331,914 A | 5/1982 | Huber .................... 327/457 |
| 4,353,390 A | 10/1982 | Karpenko ................. 137/527.8 |
| 4,382,192 A | 5/1983 | Mendelson ................ 307/141.4 |
| 4,458,239 A | 7/1984 | Willey et al. ............ 340/540 |
| 4,586,893 A | 5/1986 | Somerville et al. ........ 431/76 |
| 4,745,311 A | 5/1988 | Iwasaki .................. 327/428 |
| 4,757,865 A | 7/1988 | Simons ................... 169/39 |
| 4,791,254 A | 12/1988 | Polverari ................ 200/81.9 M |
| 4,830,218 A | * 5/1989 | Shirkhan ................. 2222/52 |
| 4,831,350 A | 5/1989 | Rose ..................... 335/205 |
| 4,866,426 A | 9/1989 | Evans et al. ............. 340/568 |
| 4,914,566 A | 4/1990 | Steutermann ............. 364/167.01 |
| 4,926,678 A | * 5/1990 | Pearman .................. 73/3 |
| 4,963,857 A | 10/1990 | Sackett .................. 340/606 |
| 4,977,963 A | 12/1990 | Simons ................... 169/37 |
| 4,987,957 A | 1/1991 | Galaszewski .............. 169/37 |
| 4,993,453 A | * 2/1991 | McHugh ................... 137/559 |
| 5,036,234 A | 7/1991 | Friedrich et al. ......... 327/457 |

(List continued on next page.)

Primary Examiner—Julie Lieu
(74) Attorney, Agent, or Firm—Burns, Doane, Swecker & Mathis, LLP

(57) ABSTRACT

A double check valve assembly having at least one three way valve with a pressure gauge in communication with the double check valve downstream of the second check valve. A flow detection arrangement with a battery powered alarm and automatic dialer and time delay circuit is included with a test and drain valve arrangement provided downstream of the second check valve.

32 Claims, 9 Drawing Sheets

U.S. PATENT DOCUMENTS

| | | | |
|---|---|---|---|
| 5,038,820 A | 8/1991 | Ames et al. | 137/486 |
| 5,063,775 A | 11/1991 | Walker, Sr. et al. | 73/155 |
| 5,072,792 A | 12/1991 | Simons et al. | |
| 5,086,273 A | 2/1992 | Leon | 324/207.17 |
| 5,140,263 A | 8/1992 | Leon | 324/207.17 |
| 5,195,592 A | 3/1993 | Simons | 169/37 |
| 5,198,973 A | 3/1993 | Steutermann | 364/167.01 |
| 5,234,059 A | 8/1993 | Eynon | 169/39 |
| 5,236,011 A | 8/1993 | Casada et al. | 137/554 |
| 5,269,344 A | 12/1993 | McHugh | 137/557 |
| 5,305,787 A | 4/1994 | Thygesen | 137/527 |
| 5,323,062 A | 6/1994 | Crawford et al. | 327/455 |
| 5,372,203 A | 12/1994 | Galaszewski | 169/37 |
| 5,390,744 A * | 2/1995 | McHugh | 169/23 |
| 5,400,446 A | 3/1995 | Bloemer et al. | 4/408 |
| 5,406,979 A | 4/1995 | McHugh | 137/557 |
| 5,504,426 A | 4/1996 | Ricci et al. | 324/207.17 |
| 5,523,682 A | 6/1996 | Leon | 324/207.17 |
| 5,589,769 A | 12/1996 | Krahn | 324/207.26 |
| 5,621,317 A | 4/1997 | Wozniak | 324/207.13 |
| 5,632,339 A | 5/1997 | Fenske et al. | 169/37 |
| 5,705,987 A | 1/1998 | Doner | 340/606 |
| 5,723,918 A | 3/1998 | Schilling et al. | 318/282 |
| 5,781,116 A * | 7/1998 | Hedger et al. | 340/606 |
| 6,081,196 A * | 6/2000 | McHugh | 340/606 |
| 6,186,169 B1 * | 2/2001 | McHugh | 137/559 |
| 6,206,034 B1 * | 3/2001 | McHugh | 137/559 |

* cited by examiner

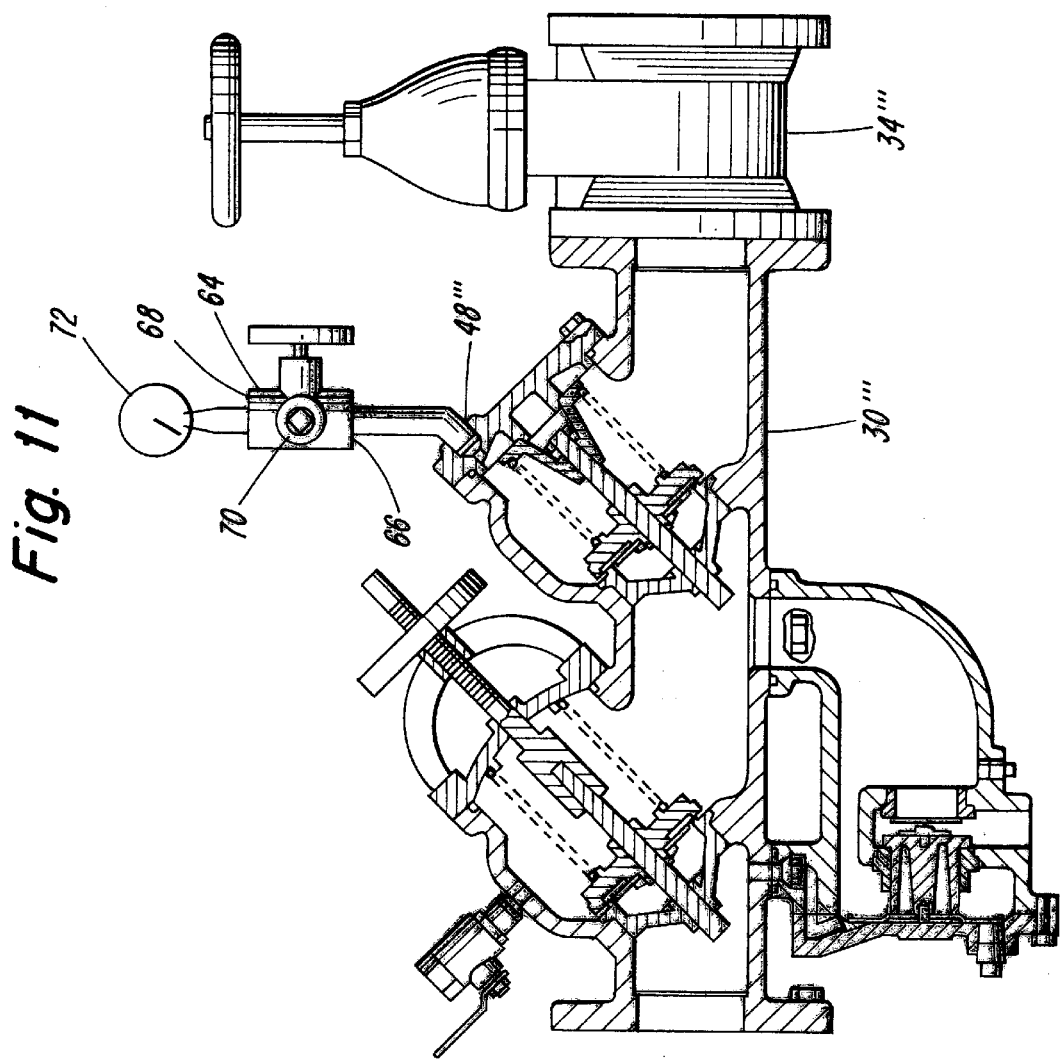

DOUBLE CHECK VALVE ASSEMBLY FOR FIRE SUPPRESSION SYSTEM

This application is a continuation-in-part of U.S. patent application Ser. No. 09/484,168 filed Jan. 18, 2000, which is a continuation-in-part of U.S. patent application Ser. No. 09/225,344 filed Jan. 5, 1999. The specification of U.S. patent application Ser. No. 09/484,168 is hereby incorporated by reference.

FIELD OF THE INVENTION

The present invention relates to a double check valve assembly and an arrangement for testing the double check valve assembly. More specifically, the present invention is directed toward a double check valve assembly for providing back-flow prevention in a fire suppression system and an arrangement for testing a double check valve assembly for providing back-flow prevention in a fire suppression system and for testing the fire suppression system.

BACKGROUND OF THE INVENTION

Double check valve systems and methods of testing those systems are well known. In addition, the use of double check valve systems in a fire suppression system is also well known to provide back-flow protection. These known systems are designed to prevent a reverse flow in water lines and to prevent non-potable water from entering a safe drinking water system.

Double check valve systems for use in fire suppression systems come in a variety of shapes and sizes and in a variety of different materials. For example, double check valve systems may be of bronze or iron or even stainless steel. Typical systems include the Series 007 and Series 775 Double Check Valve Assemblies of Watts Regulator Company, North Andover, Mass. Other typical systems are available from Conbraco, Febco, and Zurn/Wilkins as well as from other manufacturers.

The typical double check valve systems all include a first shut off valve, two independently acting, spring loaded check valves, and a second shut off valve with four test cocks provided for the double check valve system. The double check valve assemblies can be installed vertically or horizontally and typically have ball type test cocks. The shut-off valves may be of various types such as quarter-turn, full port bronze ball valve shut off valves. In the normal configuration, each check valve maintains a minimum pressure drop of 1 PSI across the valve during normal operation. In the event that the pressure downstream of the assembly rises above the supply pressure, both of the check valves are designed to close to prevent a backflow into the supply line.

If desired, the double check valve assembly may also be provided with a reduced pressure zone ("RPZ") valve which includes a hydraulically dependent, mechanically independent pressure differential relief valve located in the zone between the two check valves. The relief valve operates on a differential pressure. Supply pressure on the upstream side of the first check valve acts to close the relief valve in normal operation. If the system should have a back-pressure, the relief valve opens to maintain the pressure in the reduced pressure zone about 3 PSI less than the inlet pressure.

In addition, the double check valve assembly may be provided with bypass piping including a bypass line assembly including a water meter in series with the double check valve. In a typical arrangement all flow up to about 5 gallons per minute (GPM) occurs through the bypass piping. Flow above 5 GPM causes the check valves in the main line to open and flow occurs both through the main line as well as through the bypass piping.

In fire suppression systems, especially such systems for use in residential housing, the need exists to provide an efficient and relatively inexpensive check valve arrangement for preventing a backflow into the potable water system as well as an arrangement for testing the system.

SUMMARY OF THE INVENTION

The present invention solves the foregoing problems, and provides additional advantages, by providing a double check valve assembly in which a test port which is provided downstream of the second check valve is provided with a three way valve (such as a 3-way globe valve with a side outlet) having one inlet and two outlets with the valve permitting communication between the inlet and both outlets in one configuration and blocking communication between the inlet and both outlets in another configuration. One of the outlets of the three way valve is provided with a pressure gauge and the other of the outlets is normally closed by a plug but may serve as a test cock.

In a more preferred embodiment of the present invention, both the test port which is provided downstream of the second check valve as well as the test port which is provided between the first and second check valves is provided with a three way valve (such as a 3-way globe valve with a side outlet). One of the outlets of the second three way valve is provided with a pressure gauge and the other of the outlets is normally closed by a plug but may serve as a test cock.

In other embodiments of the present invention, the double check valve assembly may be provided with a flow detector arrangement for indicating that a flow has occurred through the back flow prevention arrangement. The flow detector may indicate that the second check valve is open or may indicate that a flow has occurred through the second check valve. Preferably, an alarm is provided for indicating that a flow has occurred, with a time controller provided to provide a time delay to prevent false alarms. The time controller is preferably battery powered with an automatic dialer provided to call a predetermined number such as a fire department or burglar alarm company in response to an indication that a flow has occurred through the double check valve assembly. The alarm, the time delay, and the automatic dialer circuitry are all preferably battery powered but can be powered by house current or conventional power lines, if desired.

The arrangement may be provided, if desired, with an arrangement for preventing a rapid closing of the shut off valves and with an arrangement for indicating the state of the shut off valves or that someone has tampered with the shut off valves.

In addition, a test and drain valve arrangement may be provided downstream of the second check valve to selectively permit a flow through the double check valve arrangement corresponding to the flow through a single sprinkler head when the valve is in a test configuration and selectively permitting the back flow arrangement to be drained when the valve is in a drain configuration.

In the present invention, a fire suppression system is also disclosed having a conduit with a flow switch, the conduit supplying fluid to a plurality of sprinkler heads, with the flow switch being battery powered, preferably independent of any line current.

In addition, the system further comprises an automatic dialer for calling a predetermined number in response to a signal from the flow switch with the automatic dialer being provided at the flow switch and preferably being battery powered independent of any line current

BRIEF DESCRIPTION OF THE DRAWINGS

The features and advantages of the present invention will be more fully understood upon reading the following Detailed Description of the Preferred Embodiments in conjunction with the accompanying drawings, in which like reference numerals indicate like elements, and in which.

DETAILED DESCRIPTION OF THE PREFERRED EMBODIMENTS

Figure 1:
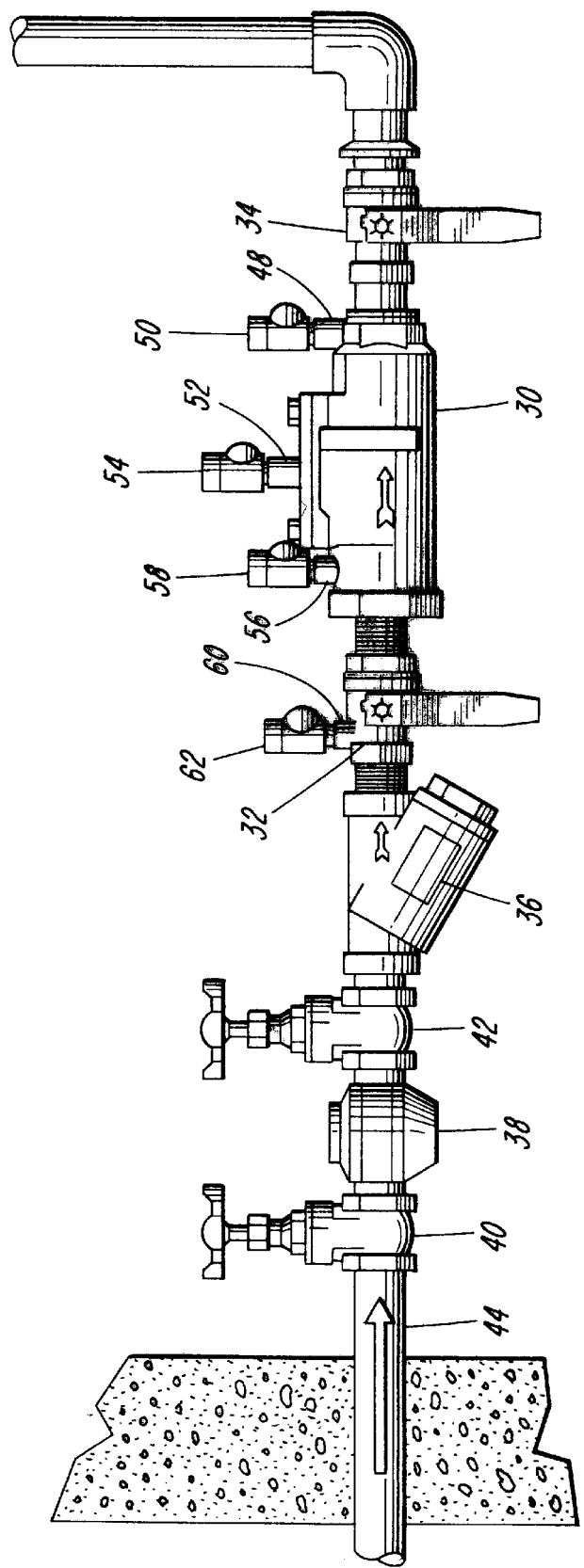
FIG. 1 illustrates a back flow prevention arrangement for a fire suppression system according to the prior art.

Referring now to FIG. 1, a double check valve back flow prevention arrangement according to the prior art is shown including a double check valve 30 of the Series 007 Double Check Valve Assemblies of Watts Regulator Company, North Andover, Mass. A first shut off valve 32 is provided upstream of the double check valve 30 with a second shut off valve 34 provided downstream of the double check valve 30.

If desired, a strainer 36 may be provided upstream of the first shut off valve with a water meter 38 provided upstream of the strainer 36. Additional shut off valves 40, 42 may be provided on either side of the water meter 38. The water supply is connected through a supply line 44 to the water meter and downstream arrangement. As is well known in the prior art, the double check valve assembly supplies water to a plurality of sprinkler heads (not shown).

In the conventional arrangement the double check valve 30 has a first test port 48 provided with a test cock 50 in communication with the downstream side of the second check valve in the double check valve 30. A second test port 52 is provided with a test cock 54 in communication with the double check valve 30 between the first and second check valves. A third test port 56 is provided with a test cock 58 in communication with the double check valve 30 upstream of the first check valve (but downstream of the first shut off valve 32). Finally, the first shut off valve 32 is provided with a fourth test port 60 having a test cock 62 in communication with the upstream side of the first shut off valve 32.

The supply of water from the second shut off valve 34 is directed to an arrangement of sprinkler heads (not shown), as desired.

It is conventional to periodically test the operation of the double check valve 30 by connecting a back flow valve test kit to various ones of the test cocks 50, 54, 58, and 62 to measure the relative pressure on different sides of the first and second check valves in the double check valve 30.

Figure 2:
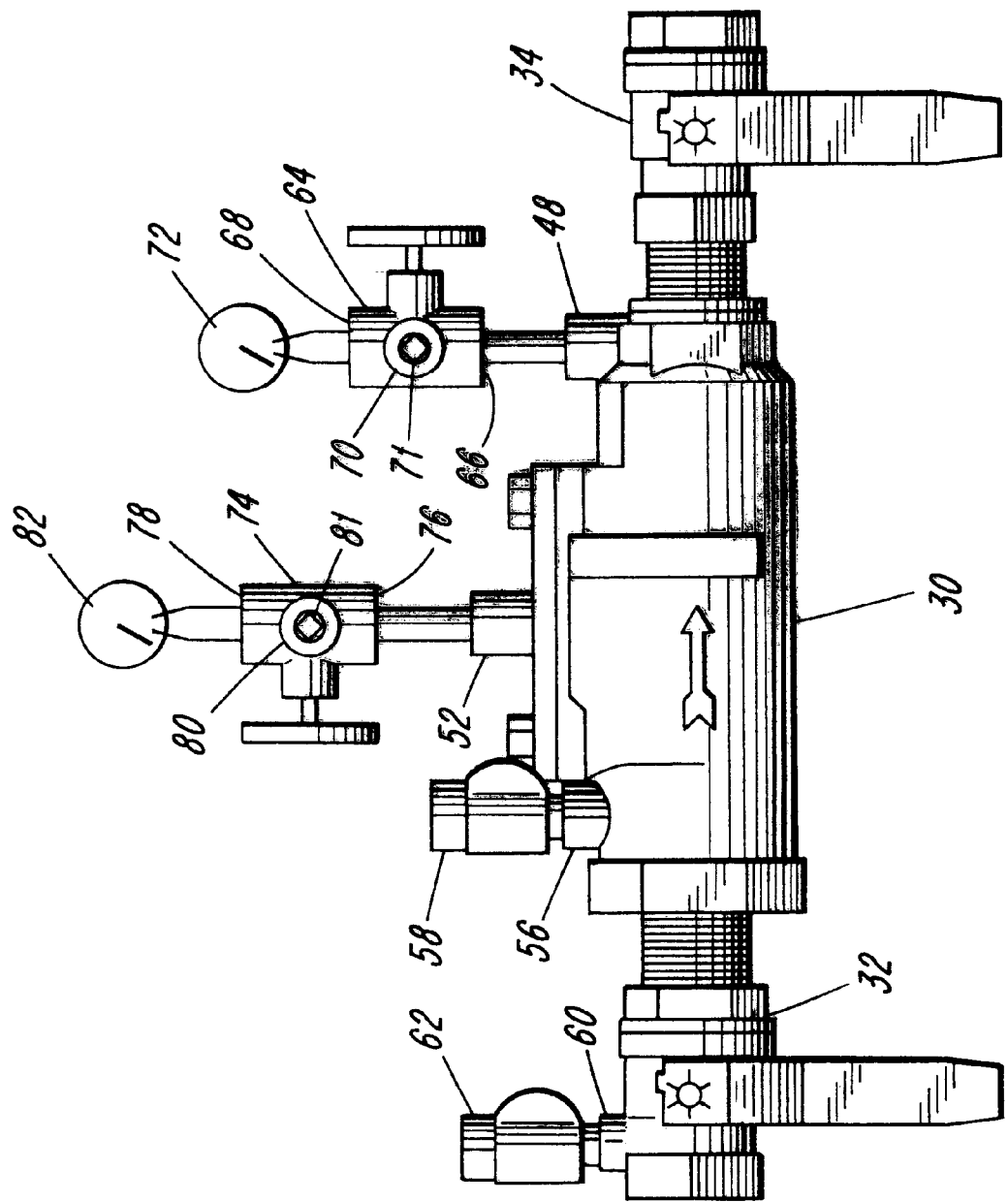
FIG. 2 illustrates a back flow prevention arrangement according to the present invention.

With reference now to FIG. 2, a double check valve arrangement according to the present invention includes a double check valve 30 with three test ports 48, 52, and 56 (as in the prior art arrangement). A first shut off valve 32 is provided upstream of the double check valve 30 with a test port 60 and a test cock 62 provided in communication with the upstream side of the first shut off valve 32. A second shut off valve 34 is provided downstream of the double check valve 30.

According to the present invention, a three way valve 64 which is preferably a globe valve, is provided at the first test cock 48 with an inlet 66 of the three way valve 64 in communication with the test port 48. The three way valve 64 has a first outlet 68 which is connected to the inlet of a pressure gauge 72. A second outlet 70 of the three way valve 64 is provided with a plug 71 so that a technician who is conducting a test of the double check valve 30 may connect the suitable hose of the check valve test kit (not shown) to the second outlet 70 of the three way valve when conducting a back flow test of the double check valve.

In the three way valve 64, the inlet 66 is in communication with both outlets 68, 70 when the valve is "open" or in a first configuration. Communication between the inlet 66 and both of the outlets 68, 70 is blocked when the valve is "closed" or in a second configuration.

The three way valve 64 and the pressure gauge 72 are provided at the test port 48 so that the testing of the double check valve 30 as well as the testing of the fire suppression system downstream of the double check valve 30 may be performed while eliminating the need for a line sized "T" fitting downstream of the second shut off valve with a suitable opening (such as a ¼ inch port). The line sized "T", typically receives a gauge valve and a pressure gauge. By the present invention, the need for the test cock 50 is eliminated and the cost of the line sized "T" as well as the cost of installation of the line sized "T" is eliminated with additional savings that result from the ability to provide the three way valve 64 on the double check valve 30 before shipping to the customer.

Moreover, according to NFPA 13, a gauge on a fire suppression system should have a shut off valve and a drain. According to the present invention, the need for such an additional shut off valve and drain would be eliminated. With reference again to FIG. 2, the second outlet 70 provides a drain for the pressure gauge and the three way valve 64 provides the shut off valve for the pressure gauge. In addition, the second outlet 70 may be used by the technician when testing the double check valve 30 as described above.

If it is desired to conduct a pressure test of the fire suppression system downstream double check valve 30, the first shut off valve 32 maybe closed and the pressure gauge 72 read to identify the pressure in the system of sprinkler heads downstream of the second check valve 34. If the reading on the pressure gauge 72 remains stable, this indicates that there is no leak in the system of sprinkler heads. If the pressure reading on the gauge 72 drops, this indicates that there is a leak downstream of the second shut off valve 34. To test the pressure gauge 72, the three way valve 64 may be closed and the plug 71 removed. If the pressure reading on the gauge drops to zero, the gauge is not frozen at a specific pressure reading. Alternatively, a second (calibrated) gauge may be connected to the second outlet of the three way valve 64 and the three way valve then reopened and the shut off valves opened to re-pressurize the system. Subsequently, the shut off valve may be re-closed and if both gauges read the same pressure, then the pressure gauge 72 is likely functioning properly. If the pressure reading remains steady on both gauges, then there likely is no leak downstream of the shut off valve in the plurality of water sprinklers.

In a more preferred embodiment of the present invention, a second three way valve 74 is provided with an inlet of the valve 74 in communication with a second test port 52 provided in communication with the double check valve 30 between the first and second check valves. The second three way valve 74 has a first outlet 78 which is provided with a pressure gauge 82 and a second outlet of the three way valve 74 is provided with a plug 81. This embodiment of the present invention is intended to comply with NFPA 13 by having a gauge upstream and downstream of the second check valve in the double check valve 30.

In any event, to conduct a cursory test of the system, a technician or other maintenance person may simply compare the readings on the two gauges. If the downstream gauge has a higher reading than the upstream gauge, this indicates that the double check valve 30 is functioning to prevent a back flow from occurring.

As before, the double check valve 30 is tested in the conventional manner with the exception that the pressure normally read at the test port 52 by connecting a pressure gauge of a test kit to a test cock (see FIG. 1) is read through the second outlet 80 of the three way valve 74. Typically, the technician testing the double check valve 30 will shut the three way valve 74 and remove the plug 81. The technician will then connect the appropriate hose of the test kit to the second outlet 80 and use the pressure gauge of the test kit (not shown) to test the double check valve.

If desired, the system of sprinkler heads may be tested for leaks by reading the pressure on the first pressure gauge 72 (and, if provided, as well on the second pressure gauge 82). The gauge 72 should read a steady pressure with the pressure on the second gauge 82 being slightly (at least 1 PSI) higher than the reading on the first gauge 72. If both gauges do not show a decrease in pressure this indicates that there is no leak in the system of sprinkler heads and piping downstream of the second check valve 34.

When conducting a back-flow test, the second shut off valve 34 is closed with the handle or valve actuator in an "off" position. When conducting a fire test, the valve 34 must be open with the handle or valve in an "open" or "test" position so that water may flow past the flow switch 88.

Figure 3:
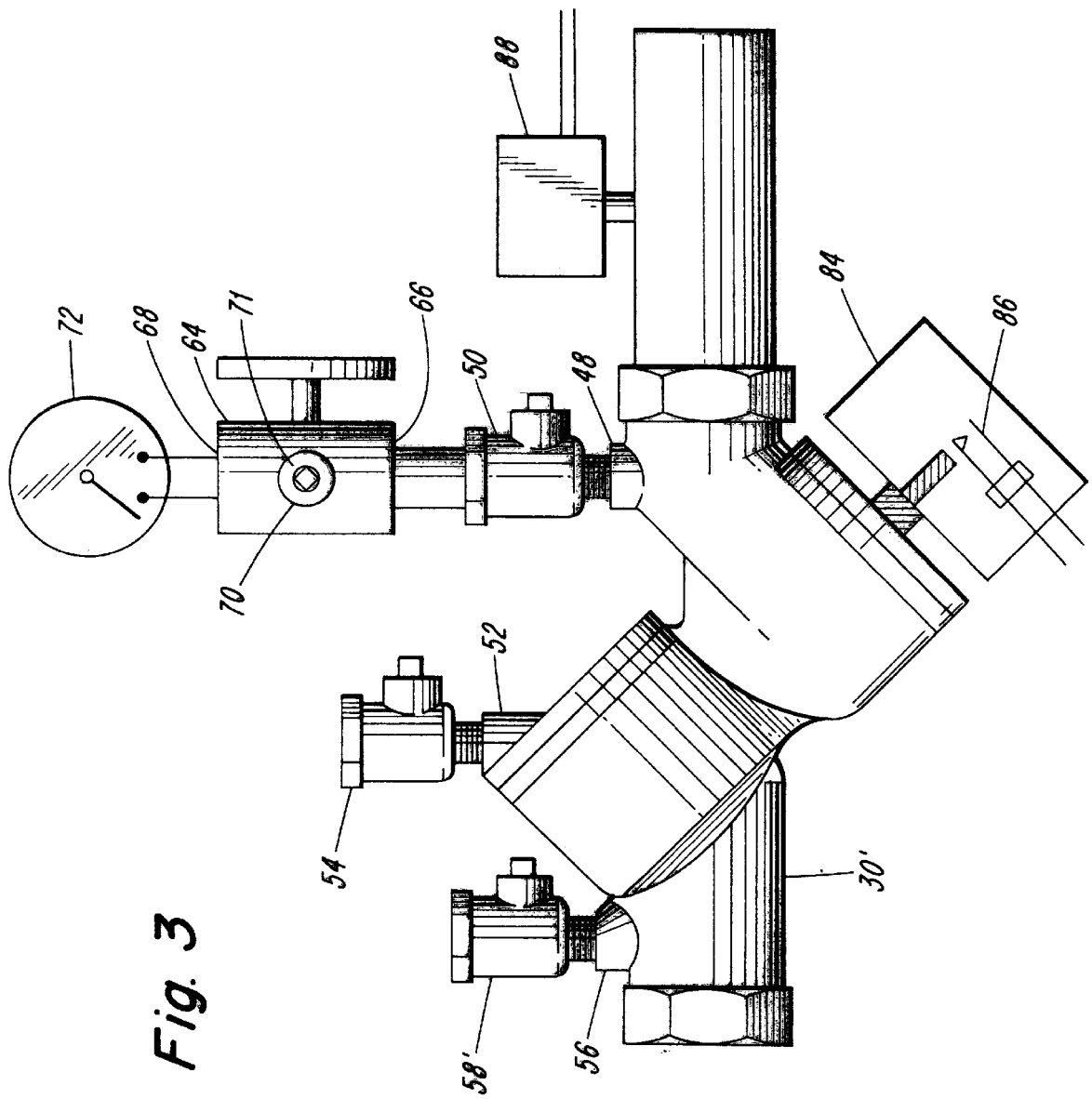
FIG. 3 illustrate another back flow prevention arrangement according to the present invention.

With reference now to FIG. 3, another version of a conventionally available double check valve 30' such as the Model 709 Double Check Valve Assembly of Watts Regulator Company, North Andover, Mass., is shown. In this arrangement, the first check valve is oriented at a different angle than the second check valve in the double check valve assembly, in a manner that is well known in the art In the embodiment of FIG. 3, the test ports 48, 52, and 56 are provided with test cocks 50', 54', and 58'. Although in the preferred embodiment, the test cock 50 is omitted, it may be preferable to include the test cock 50 (or some other suitable plumbing fixture) if the piping size between the test port 48 and the inlet of the three way valve 66 are not complimentary.

In the embodiment of FIG. 3, a flow detector 84 is provided in connection with the second check valve of the double check valve 30'. In a preferred embodiment, a rod or actuator of the piston in the spring loaded check valve actuator is extended so that when the second check valve is open, a switch 86 is closed to provide a signal. (See, for example, the arrangement of U.S. Pat. No. 3,896,850 which is incorporated herein by reference.) The signal indicates that the second check valve is open and that a flow is permitted to occur through the double check valve 30'.

Alternatively (or in addition), a flow switch 88 may be provided downstream of the second check valve with, for example, a paddle that extends into the passageway at the outlet of the double check valve 30'. If the paddle is deflected by a flow through the passageway, a switch is closed again sending a signal indicating that there is a flow through the double check valve and that at least one of the sprinkler heads has likely opened as a result of a fire.

As a result of cost and reliability considerations, the use of a magnetically operated reed switch is likely the most preferred embodiment for the flow switch. The disk or paddle of the second check valve preferably provides the switch or trigger for the flow switch by having a magnetic member provided on the disk or paddle or on a stem of the check valve which typically moves along a straight line.

Figure 4:
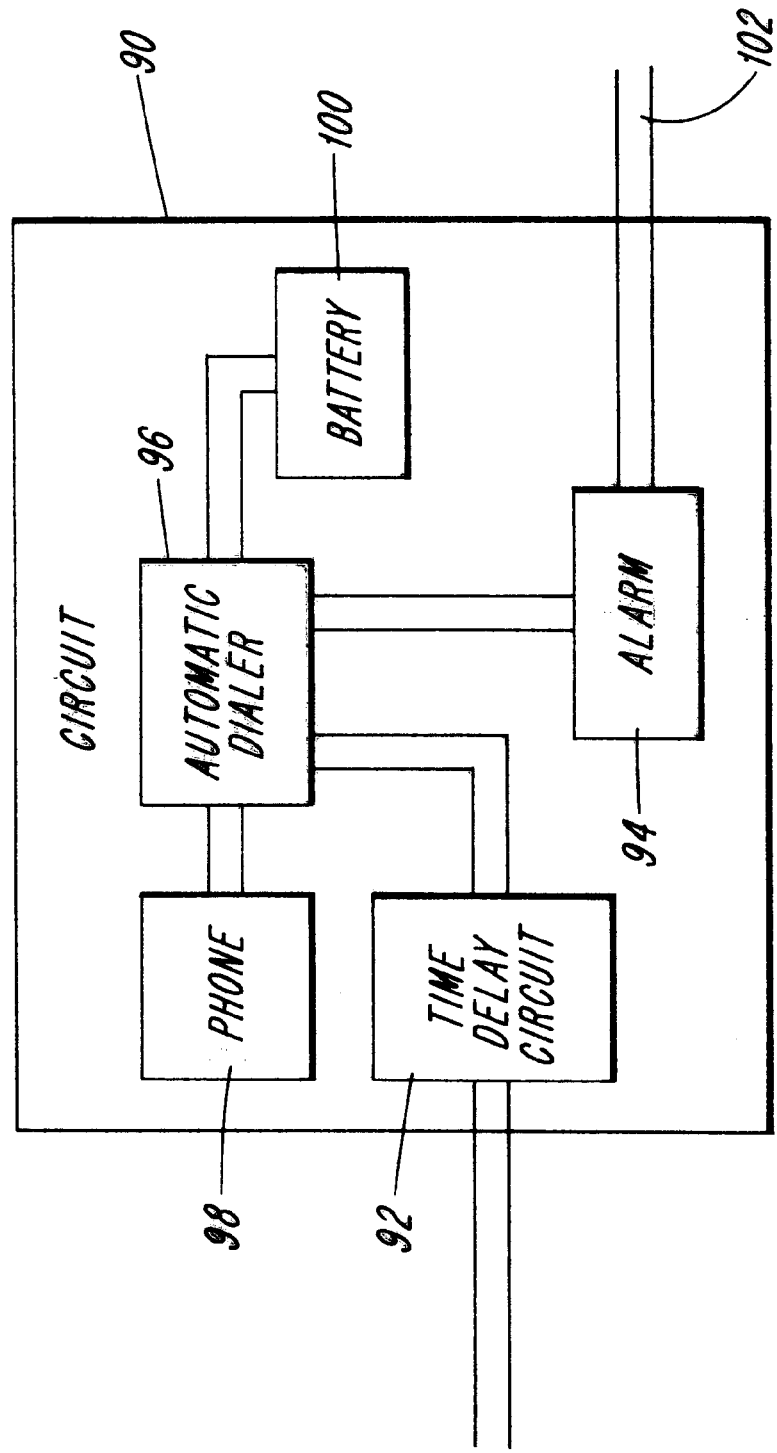
FIG. 4 illustrates a schematic diagram of a circuit for the back flow prevention arrangement of FIG. 3.

With reference now to FIG. 4, preferably the signal from the switch 86 or from the switch 88 is sent to a circuit 90 which includes a time delay circuit 92 to prevent an alarm from sounding for a preselected period of time such as up to 90 seconds. In this way, if the switch 88, or 86 has closed due to an intermittent flow such as from water hammer or surge, the time delay circuit will prevent a false alarm from sounding. If the switch 86, 88 remains closed for more than the predetermined period of time set in the time delay circuitry, an alarm signal will be sent through the alarm circuitry 94. Water surge is a well known situation in fire suppression systems and typically results from a rise in water pressure as may result overnight when water usage in the community is low. In addition, as the temperature of the water in the water sprinkler system rises (for example, during the day due the ambient air temperature) the pressure in the system may increase as well.

Preferably, the circuitry also includes an automatic telephone dialer which will either dial a predetermined telephone number to advise the fire department or a private service of the possibility of a fire due to the flow through the double check valve 30' over land lines or over a cellular or digital phone 98. Preferably, all of the circuitry including the time delay circuit 92, the alarm 94, and the automatic dialer 96 and phone 98 are battery powered by a battery source 100. If desired, the alarm may be provided over land lines 102 to a ringer or light or other suitable indicator provided at the residence, building or other desired location. In addition, it is preferable that the circuitry 90 all be provided at the double check valve 30' such as inside the flow detector 84 or 88.

Figure 5:
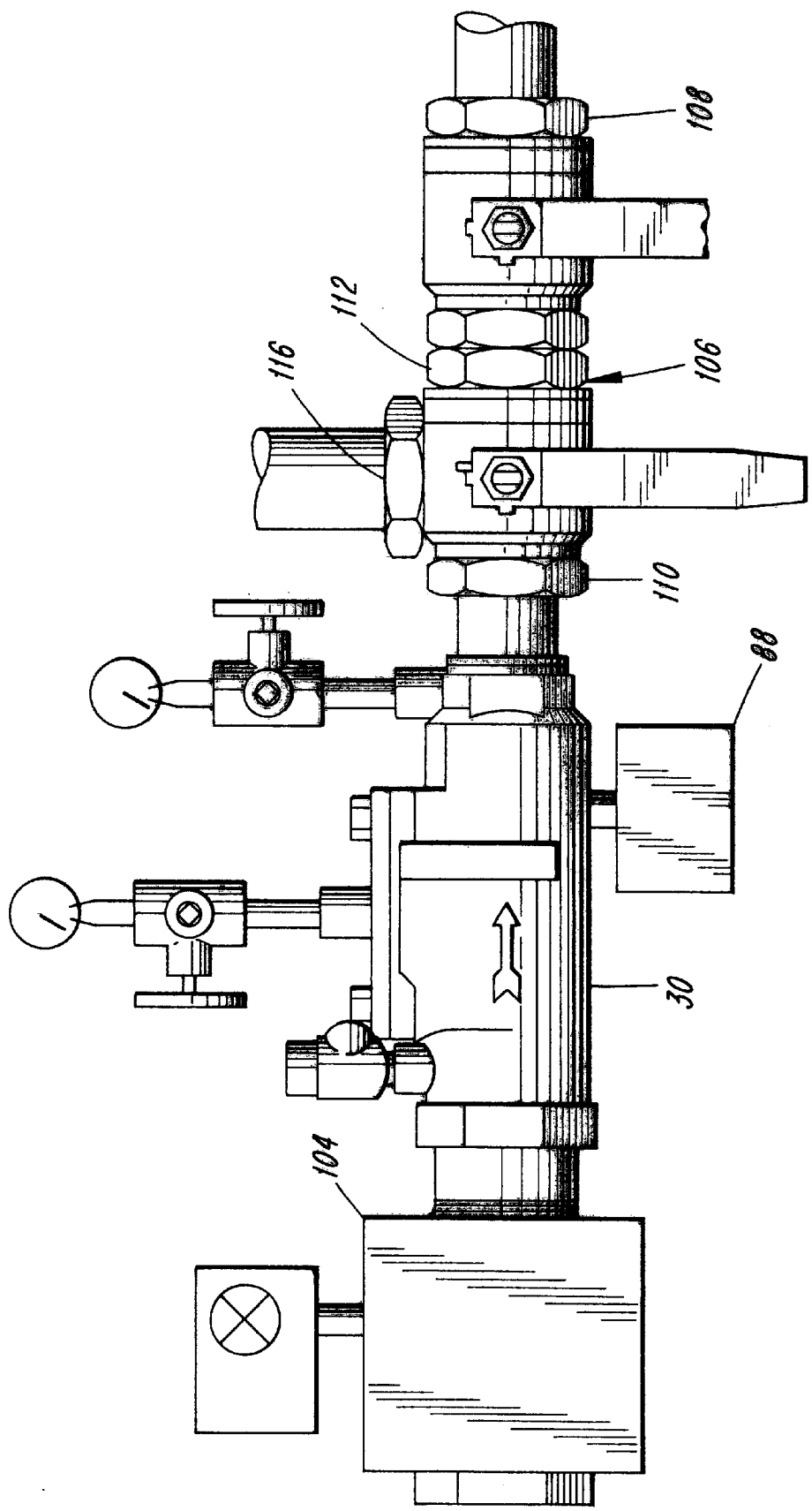
FIG. 5 illustrates another back flow prevention arrangement according to the present invention.

With reference now to FIG. 5, the double check valve assembly 30 of FIG. 2 is provided with a flow detector 88 downstream of the second check valve. The flow detector 88 preferably is battery powered and includes all of the circuitry (time delay, automatic dialer and alarm) of FIG. 4. In addition, the first shut off valve 32 is preferably replaced by a slow-close valve 104 which has an arrangement to indicate any tampering with the valve. (In order to provide fire suppression, it is important that both shut off valves be maintained in an open state. In addition, to prevent water hammer, the shut off valves should be "slow-close" to prevent them from being rapidly opened or closed)

Figure 8:
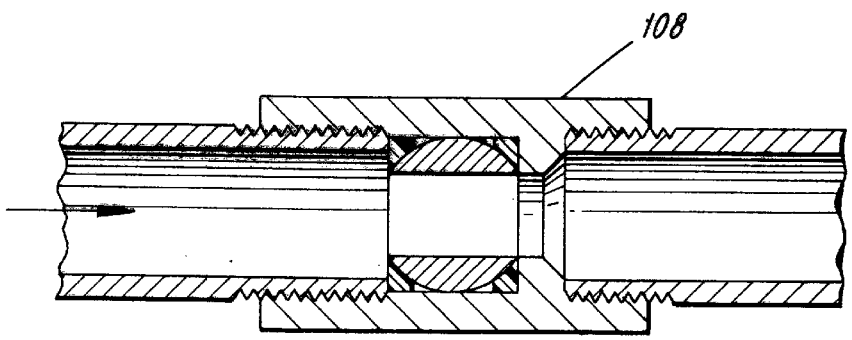
FIG. 8 illustrates another valve of the back flow arrangement of FIG. 5.

In addition, the second shut off valve 34 has been replaced by a pair of valves 106, 108 to provide test and drain features for the assembly. The first valve 106 is preferably a "monitored" valve and is a three way valve with an inlet 110 of the valve connected to the outlet of the double check valve 30. A first outlet 112 of the valve 106 is connected to the system of sprinkler heads and piping to provide the fire suppression system (not shown). The second outlet of the valve 106 is provided to the inlet of the second valve 108 (see FIG. 8) with the outlet of the second valve connected to a drain line. By having the first valve 106 together with the second valve 108, both a back flow test as well as a fire test may be performed on the system. When the first valve 106 is open, flow of water to the system of sprinkler heads is permitted but when the first valve 106 is closed, the valve acts as an isolation valve to permit the technician to conduct a back flow test.

Figure 6:
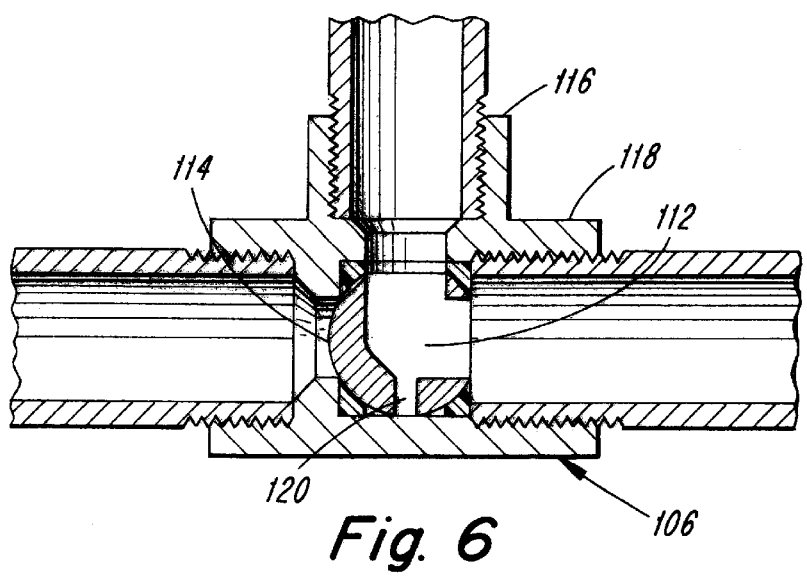
FIG. 6 illustrates a shut off valve of the back flow arrangement of FIG. 5 in a first configuration.

With reference now to FIG. 6, when the valve 106 is in a first "drain" configuration, the inlet 110 is closed by a solid portion 114 of the ball valve member 112. The ball valve member also includes a passageway through the ball valve member connecting an outlet 116 of the valve with the other outlet 118 of the valve 106. In this "drain" configuration, the first outlet of the valve 106 may be drained through the second outlet 118.

Figure 7:
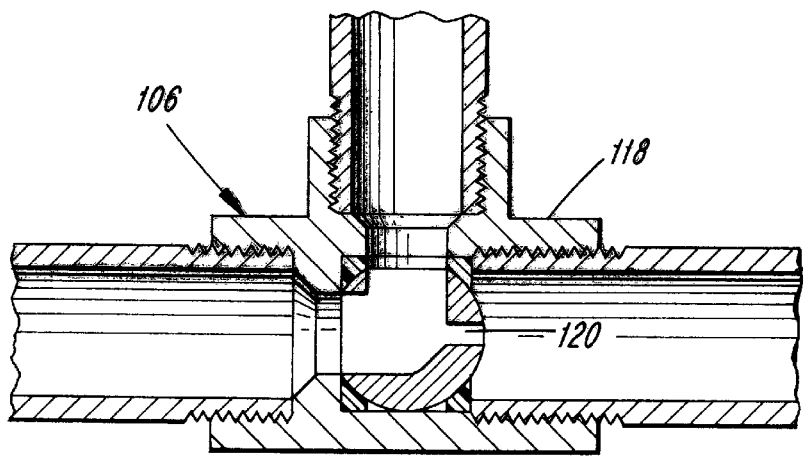
FIG. 7 illustrates the valve of FIG. 6 in a second configuration.

The ball valve member 112 is also provided with an opening 120 having a size permitting a flow through the opening 120 corresponding to the flow through a single sprinkler head. In this way, when the handle actuator 122 of the valve 106 is moved to the test/open position (see, FIG. 7), the first outlet 116 is provided in full communication with the inlet of the valve 110 from the second check valve of the double check valve 30. In addition, flow through the restricted orifice or, opening 120 is permitted to the second outlet of the valve 106.

When it is desired to provide a test of the flow switch, the second valve 108 is opened which then allows a flow through the restricted orifice of the first valve 106 (when the handle is in the test/open position). When the valve 108 is closed, flow through the restricted orifice 120 is prevented and the valves are in their normal configuration to provide a fire suppression feature.

If desired, sight glasses may be provided downstream of the outlet of the second valve and a pressure relief valve, preferably positioned between the first valve 106 and the second valve 108, may be provided in communication with the system of sprinkler heads. In this way, the pressure relief valve is in communication with the supply pressure through the restricted orifice of the ball valve member 112 when the first valve 106 is in the test/open configuration. The first and second valves 106, 108 are most appropriate for use with relatively small back flow valves such as may be used in connection with residential housing. If the back flow valves are relatively large, suitable valves for use with the relatively large back flow valves would be readily apparent to one skilled in the art.

The second valve 108 may be replaced with a pressure relief valve which may be manually opened, when desired, to provide a drain when the valve 106 is being used to conduct a fire test.

Alternatively, a single valve may be provided at the downstream side of the second check valve of the double check valve 30 such as is shown in U.S. Pat. No. 5,269,344 of George McHugh (see FIGS. 20–25). The valve shown in FIGS. 20–25 provides the test and drain features for the system and allows the valve to be shut off for testing, etc. as described above.

In the preferred embodiment both the first and second "shut off valves" are monitored so as to detect any tampering with the valves or to indicate that the valves are both in the normal "open" configuration. In the embodiment of FIG. 5, the valve 106 would be in the test/open configuration and the valve 108 would be in the off or closed configuration.

Figure 9:
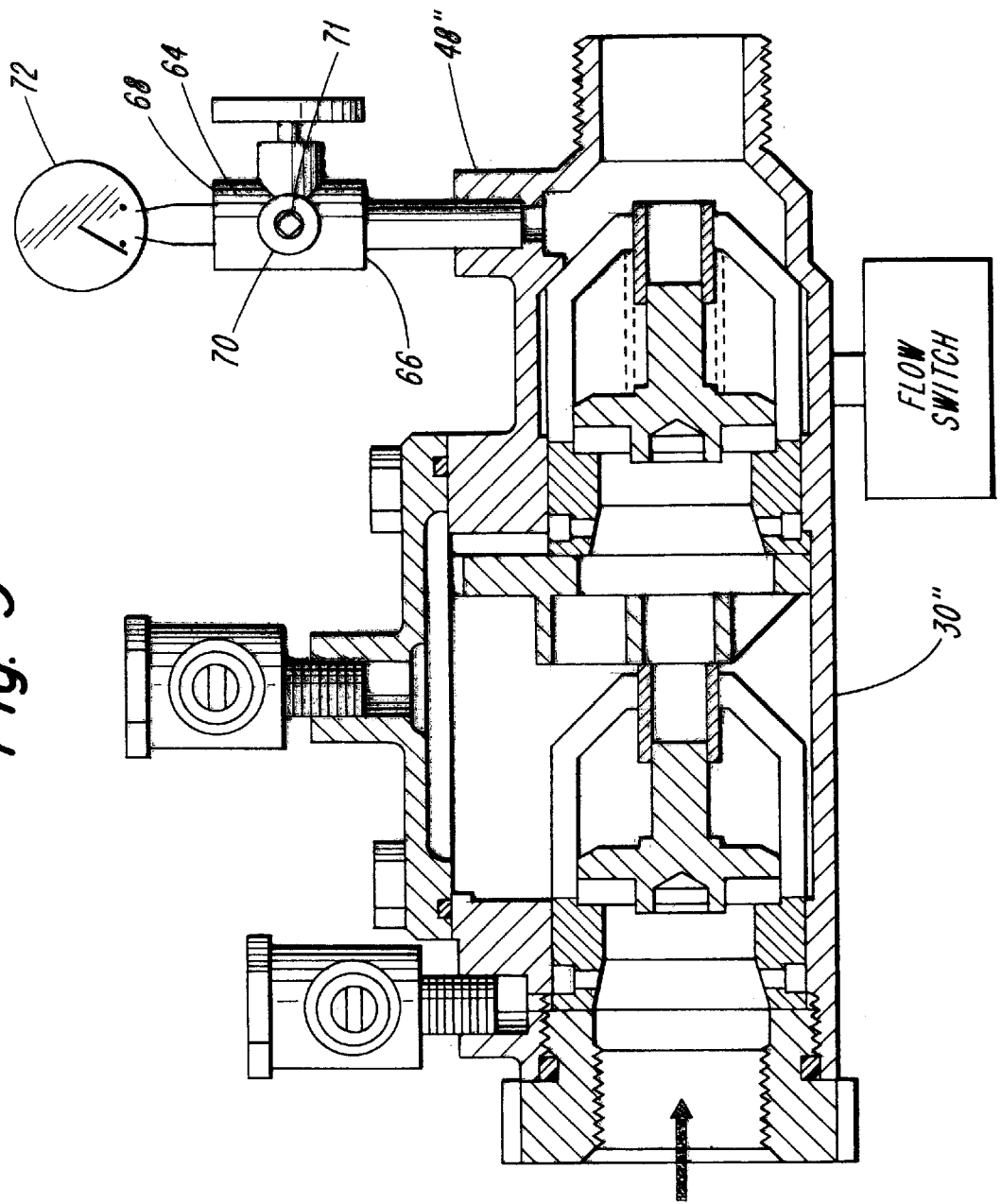
FIG. 9 illustrates another back flow prevention arrangement according to the present invention.

With reference to FIG. 9, another double check valve 30" is provided with a three way valve 64 at a test port 48" downstream of the second check valve. Similarly, with reference to FIG. 10, another double check valve 30'" is provided with a three way valve 64 at a test port 48'" downstream of the second check valve. The double check valve 30'" is provided with a reduced pressure zone pressure relief valve.

Figure 10:
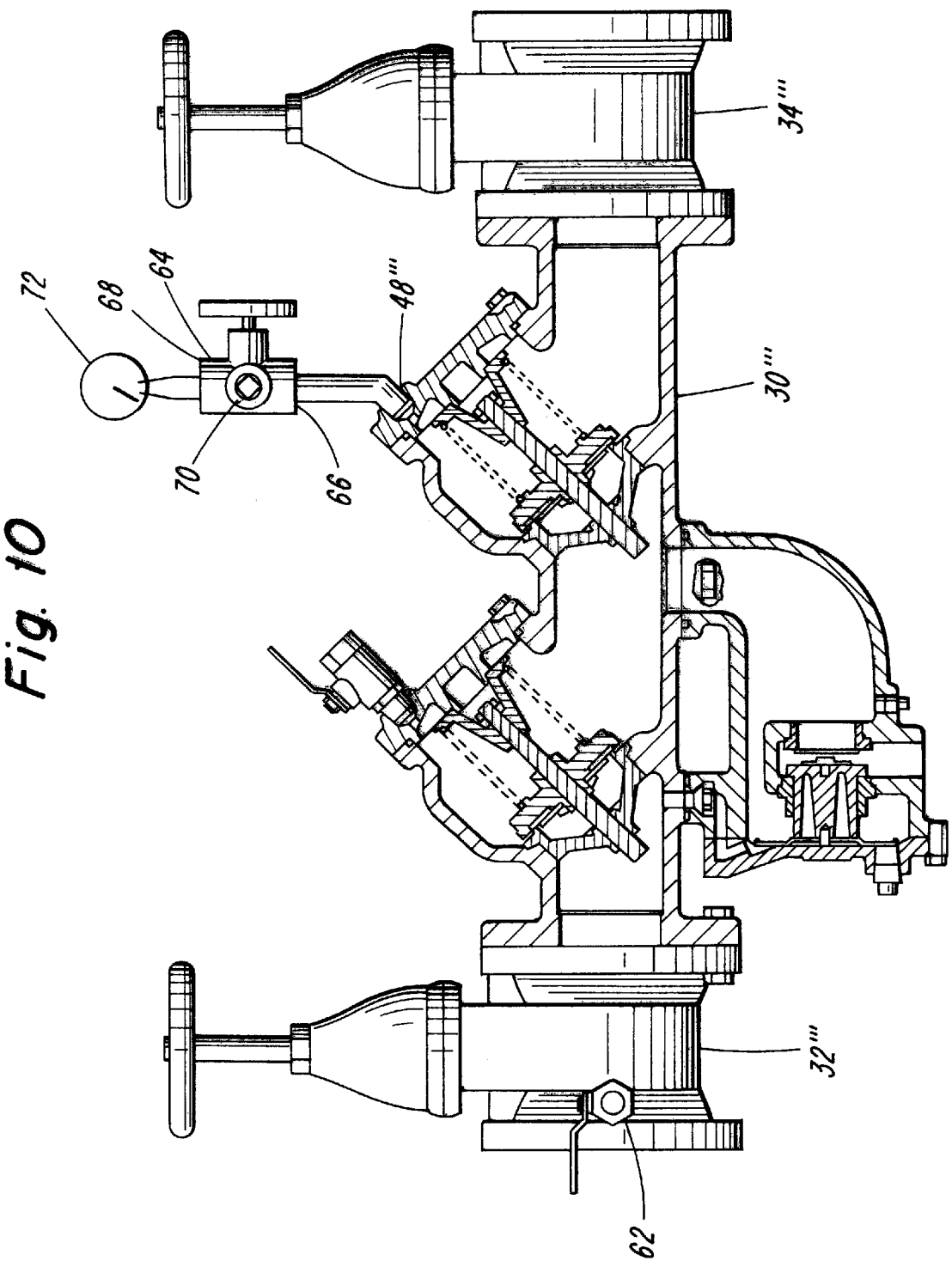
FIG. 10 illustrates another back flow prevention arrangement according to the present invention; and, FIG. 11 illustrates another back flow prevention arrangement according to the present invention.

With reference now to FIG. 11, the double check valve 30'" of FIG. 10 is provided with a stop check valve as the first check valve in the double check valve assembly. Double check valves are themselves well known and the double check valve is preferably has a manual shut-off of the indicating (O S & Y) type. In the embodiment of FIG. 11, the need for the first shut-off valve 32'" (see FIG. 10) is eliminated If the test port 60 and test cock 62 are required, they may be provided in any suitable fitting upstream of the shut off check valve. With reference to FIG. 11, the test port and test cock for the first check valve have been relocated to the side of the first check valve. The test port and test cock for the first check valve may be provided at any suitable location where the test port is in communication with the double check valve between the first and second check valves.

The foregoing description, while including many specificities, is intended to be illustrative of the general nature of the invention and not limiting. It will be appreciated that those skilled in the art can, by applying current knowledge, readily modify and/or adapt the specific embodiments described above for various applications without departing from the spirit and scope of the invention, as defined by the appended claims and their legal equivalents.

What is claimed is:

1. A back flow prevention arrangement for a fire suppression sprinkler system, comprising:
   a first check valve;
   a second check valve;
   a first test port downstream of the second check valve;
   a second test port provided between the first check valve and the second check valve;
   in a third test port upstream of the first check valve;
   a first three way valve having an inlet and first and second outlets, the inlet of the three way valve being provided at the first test port; and,
   a first pressure gauge provided at one of the first and second outlets of the three way valve.

2. The back flow prevention arrangement of claim 1, wherein a test cock is provided between the first test port and the inlet of the three way valve.

3. The back flow prevention arrangement of claim 1, further comprising:
   a shut-off valve provided upstream of the first check valve with a fourth test port provided upstream of the shut-off valve.

4. The back flow prevention arrangement of claim 1, further comprising:
   a second three way valve having an inlet and first and second outlets, the inlet of the second three way valve being provided at the second test port; and, a second pressure gauge provided at one of the first and second outlets of the second three way valve.

5. The back flow prevention arrangement of claim 1, wherein the other of the first and second outlets of the first three way valve is provided with a removable plug.

6. The back flow prevention arrangement of claim 1 wherein the first three way valve is a globe valve and wherein the inlet is in communication with the first and second outlets of the three way valve in a first configuration and wherein the inlet is not in communication with the first and second outlets in a second configuration.

7. The back flow prevention arrangement of claim 1 further comprising
flow detector means for indicating that a flow has occurred through the back flow prevention arrangement.

8. The back flow prevention arrangement of claim 1 further comprising:
flow detector means for indicating that a flow has occurred through the second check valve of the back flow prevention arrangement.

9. The back flow prevention arrangement of claim 8 wherein the flow detector means senses whether the second check valve is open.

10. The back flow prevention arrangement of claim 8 wherein the flow detector means senses whether a flow has occurred through the second check valve.

11. The back flow prevention arrangement of claim 7 further comprising:
alarm means for providing an alarm in response to an indication from the flow detector means that a flow has occurred through the back flow prevention arrangement.

12. The back flow prevention arrangement of claim 11 further comprising:
time controller means for adjustably controlling the time required to generate the alarm.

13. The back flow prevention arrangement of claim 12 wherein said time controller means is battery powered.

14. The back flow prevention arrangement of claim 8 further comprising:
alarm means for providing an alarm in response to an indication from the flow detector means that a flow has occurred through the second check valve; and,
automatic dialing means for calling a predetermined telephone number in response to an indication from the flow detector means that a flow has occurred through the second check valve.

15. The back flow prevention arrangement of claim 14 wherein the automatic dialing means is provided at the second check valve.

16. The back flow prevention arrangement of claim 15 wherein the automatic dialing means is battery powered.

17. The back flow prevention arrangement of claim 3 further comprising:
means for preventing a rapid closing of the shut off valve.

18. The back flow prevention arrangement of claim 17 further comprising:
means for detecting tampering with the shut off valve.

19. The back flow prevention arrangement of claim 1 further comprising:
test and drain valve means for testing and draining the back flow prevention arrangement, said test and drain valve means selectively permitting a flow corresponding to the flow through a single sprinkler head in a test configuration and selectively permitting the back flow prevention arrangement to be drained in a drain configuration.

20. The back flow prevention arrangement of claim 19 wherein the test and drain valve means is provided downstream of the second check valve.

21. The back flow prevention arrangement of claim 7 wherein the test and drain valve means is provided downstream of the flow detector means.

22. The back flow prevention arrangement of claim 8 wherein the second check valve is a spring loaded check valve comprising an inlet and an outlet with spring loaded valve member means which prevents passage of fluid from the inlet to the outlet of the second check valve in a closed position, and which allows passage of fluid from the inlet to the outlet of the spring loaded check valve in an open position and wherein the flow detector means includes sensing means associated with the spring loaded valve member means for sensing the position of the spring loaded valve member means.

23. The back flow prevention arrangement of claim 14 wherein the automatic dialing means is provided at the flow detector means.

24. The back flow prevention arrangement of claim 23 wherein the flow detector means includes a flow switch at the second check valve and wherein the automatic dialing means is provided at the flow switch.

25. The back flow prevention arrangement of claim 23 wherein the flow detector means includes a flow switch and wherein the automatic dialing means is provided at the flow switch.

26. The back flow prevention arrangement of claim 1 further comprises a conduit with a flow switch, said conduit supplying fluid to a plurality of sprinkler heads the improvement wherein the flow switch is battery powered.

27. The improvement of claim 26 wherein the flow switch is battery powered independent of any line current.

28. The improvement of claim 26 further comprising automatic dialer means for calling a predetermined number in response to a signal from the flow switch with the automatic dialer means being provided at the flow switch.

29. The improvement of claim 26 further comprising automatic dialer means for calling a predetermined number in response to a signal from the flow switch with the automatic dialer means being provided at the flow switch and wherein the automatic dialer means is battery powered independent of any line current.

30. A back flow prevention arrangement for a fire suppression sprinkler system, comprising:
a first check valve;
a second check valve;
a first test port downstream of the second check valve;
a second test port provided between the first check valve and the second check valve;
a first three way valve having an inlet and first and second outlets, the inlet of the three way valve being provided at the first test port and,
a first pressure gauge provided at one of the first and second outlets of the three way valve.

31. The back flow prevention arrangement for a fire suppression sprinkler system according to claim 30 wherein the first check valve is a shut off check valve.

32. The back flow prevention arrangement for a fire suppression sprinkler system according to claim 31 wherein the shut off check valve indicates whether the valve is open or closed.

* * * * *